United States Patent
O'Meara et al.

(10) Patent No.: US 9,569,191 B2
(45) Date of Patent: Feb. 14, 2017

(54) DYNAMIC PROGRAMMING PLATFORM FOR IMPLEMENTING BULK DATA OPERATORS IN A MULTITHREADED ENVIRONMENT

(71) Applicant: SoundSpectrum, Inc., New York, NY (US)

(72) Inventors: Andrew C. O'Meara, Austin, TX (US); Joel Stanley, Austin, TX (US)

(73) Assignee: SOUNDSPECTRUM, INC., New York, NY (US)

( * ) Notice: Subject to any disclaimer, the term of this patent is extended or adjusted under 35 U.S.C. 154(b) by 0 days.

(21) Appl. No.: 14/850,160

(22) Filed: Sep. 10, 2015

(65) Prior Publication Data

US 2016/0070544 A1    Mar. 10, 2016

(51) Int. Cl.
G06F 9/44    (2006.01)
G06F 9/45    (2006.01)

(52) U.S. Cl.
CPC .............. *G06F 8/456* (2013.01); *G06F 8/443* (2013.01)

(58) Field of Classification Search
None
See application file for complete search history.

(56) References Cited

U.S. PATENT DOCUMENTS

2013/0047163 A1* 2/2013 Marathe .............. G06F 11/3608
                                                    718/104

* cited by examiner

*Primary Examiner* — Chuck Kendall
(74) *Attorney, Agent, or Firm* — Hoffman Warnick LLC

(57) ABSTRACT

A system, method and program product for implementing a dynamic programming platform. An embodiment is disclosed having: a system for generating code for a multi-threaded runtime environment, wherein the system includes an infrastructure for sharing bulk data between different threads without data-level synchronization; and a bulk data processing system having a set of bulk data operators that can operate on slices of the bulk data during runtime while different threads process the bulk data.

20 Claims, 3 Drawing Sheets

DYNAMIC PROGRAMMING PLATFORM FOR IMPLEMENTING BULK DATA OPERATORS IN A MULTITHREADED ENVIRONMENT

The present invention claims priority to U.S. Provisional Patent Application entitled "MULTI-DIMENSIONAL PRIMITIVE OBJECTS (BDPS) DESIGNED TO SUPPORT ARBITRARY USER-LEVEL MULTI-THREADED COMPUTATIONAL DESIGN PATTERNS" Ser. No. 62/048,496, filed on Sep. 10, 2014, the contents of which is hereby incorporated be reference.

BACKGROUND

1. Technical Field

The present invention relates generally to dynamic programming environments, and more particularly to a dynamic programming platform that supports bulk data operators designed to operate in a shared memory space in a multi-threaded environment.

2. Related Art

In data-centric software development, it is typical to identify and lay out blocks of raw data (typically large volumes of floating point or integer data) that developers desire to access both (a) en masse (rather than at the element level) and (b) from multiple threads with as little synchronization overhead as possible.

As to (a), accessing data en masse rather than at the element level generally makes code more compact and maintainable, but also increases overall performance significantly because loops that had to previously make passes though data elements instead appear as primitive and compact operations within the language execute in efficient, native, "tight" loops with minimal overhead.

Regarding (b), developers also seek to access shared blocks of data from multiple worker threads in organized ways specifically designed to remove the need for thread synchronization. When worker threads can easily access and operate on sub-sections of the data in a parallel fashion, then the host platform's hardware can be fully loaded with negligible synchronization overhead (rather than, e.g. confining computation to a single thread or be impaired by costly use of OS-level heavyweight synchronization). For example, it's typical and effective for large buffers to be shared between worker threads where, by design, each worker thread only accesses predetermined sub-ranges of the input and output data buffers. This allows multiple worker threads to run simultaneously without synchronization overhead since their working range of data access has been designed so that each worker thread can read and write concurrently without any possibility of data loss or corruption due to race conditions.

These "developer knows best" design patterns are attractive because they require no synchronization overhead and crafted to be inherently safe and uncomplicated. However, if a dynamic language runtime imposes a synchronization specification for all data access, then even a multi-threaded design pattern without any need for synchronization will perform poorly as each data element access incurs the synchronization overhead imposed by the runtime environment.

There is a clear demand for software developers to access large blocks of raw data (a) en masse to reduce total overhead and (b) in sub-sections that multi-threaded worker design patterns can leverage to remove any need for data access synchronization. That is, as dynamic languages evolve, it's clear there's a contemporary demand for built-in, high performance, "element-wise" computation on large blocks of raw data that can be accessed outside the language's normal requirements of object safety and synchronization.

There are a number of third-party add-ons that deliver data computation tools that address some of these aspects (generally associated with efficient and parallelizable bulk data computation), but by nature of being third-party add-ons, they impose restrictions on the host platform and therefore the portability of code that uses these add-ons. Because they also add-on to the language environment, they require developers to invest time setting up the add-on and learning the details and nuances of the particular add-on. Host platform restrictions or a new learning curve may not impede some developers, but they do restrict a language's broader appeal since every developer interested in clean and efficient bulk data computation is immediately burdened with having to reinvent the computational wheel (or at least shop around for one and deal with installing it).

SUMMARY

Figure 1:
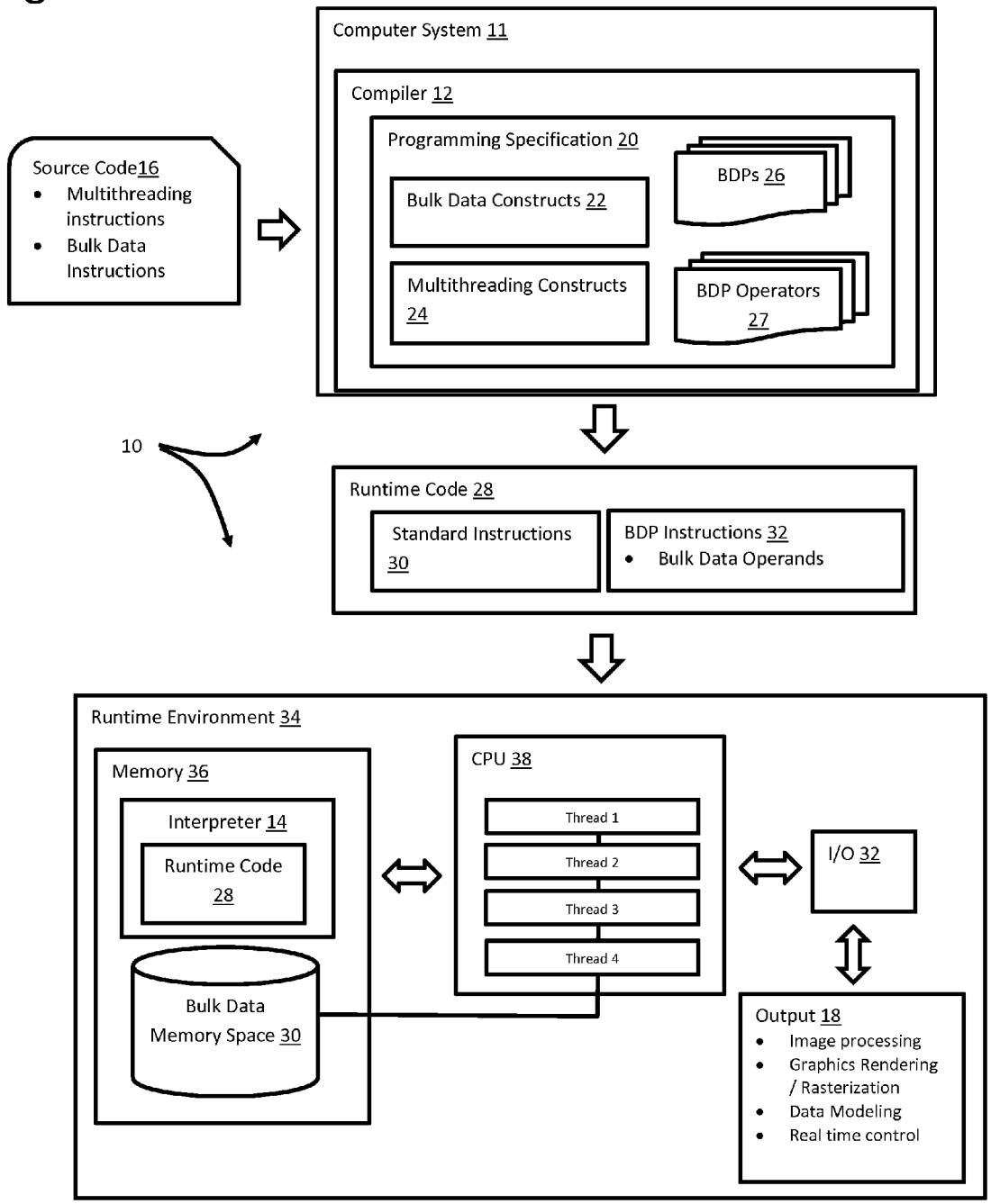
FIG. 1 shows computer system and runtime environment according to embodiments.

The present invention provides a dynamic programming platform having built-in bulk data objects integrated into a dynamic language specification and supporting runtime, and which allows for the sharing of bulk data between different threads without synchronization. Accordingly, developers are able to develop projects without investing in crafting or learning new platform-specific extensions designed to work around a dynamic language implementation ill-equipped for clean and efficient bulk data computation.

In a first aspect, the invention provides a computer program product stored on a computer readable storage medium, which when executed by a computing system implements a dynamic programming platform, the computer program product comprising program instructions that: generate code for a multithreaded runtime environment, and that provide an infrastructure for sharing bulk data between different threads without data-level synchronization; and process bulk data by providing handlers for processing a predefined set of bulk data operators that can operate on slices of the bulk data during runtime while different threads of the multithreaded runtime environment process the bulk data.

In a second aspect, the invention provides a dynamic programming platform, comprising: at least one computing system having a processor and a memory; a compiler for generating runtime code and having a programming specification for creating bulk data primitive (BDP) instances and implementing BDP operators to bulk operate on data stored by BDP instances, and for supporting multithreaded operations without data-level synchronization; and an interpreter for processing the runtime code on the at least one computing system and having a set of BDP handlers for processing BDP operators at runtime, the interpreter including a system for instantiating a BDP instance of a given element type and a set of dimensions; a system for querying the dimensions of a BDP instance; a system for altering the dimensions of a BDP instance; and a system for instantiating a new BDP instance that references a slice of an existing BDP instance.

In a third aspect, the invention provides a computing system having an interpreter for processing runtime code, the interpreter comprising: a set of bulk data primitive (BDP) handlers for processing BDP operators; a system for instantiating a BDP instance of a given element type and a set of dimensions, wherein the BPD instance includes an associated BDP storage object allocated in memory heap; a system for instantiating further BDP instances that reference a slice of an existing BDP instance; and a system for processing different BDP instances on different threads of a multithreading process.

DETAILED DESCRIPTION

The present invention provides a dynamic programming platform that supports bulk data operators, also referred to as "bulk data primitives" or BDPs, capable of operating in a shared memory space in a multithreaded environment. For the purposes of this disclosure, the phrase dynamic programming platform refers to a programming specification (e.g., constructs, syntax rules, etc.) and runtime environment for supporting a dynamic programming language, e.g., implemented with a compiler and an interpreter. The dynamic programming language provides a high-level programming language, similar to Python, Ruby, Perl, JavaScript and numerous others, which, at runtime, executes many common programming behaviors that static programming languages perform during compilation.

As noted, the dynamic programming platform provided herein supports multithreading in which two or more instruction streams (threads) execute concurrently on a CPU. Each thread is contained in a process that is managed by the OS and run concurrently over the available CPUs. As described herein, the dynamic programming platform allows each of the threads to perform bulk data operations within a shared memory space. This is particularly useful in systems where multithreading greatly improves performance, such as image processing, graphics rendering and rasterization, and data modeling.

Referring now to the drawings, FIG. 1 depicts a dynamic runtime platform 10 that generally includes a compiler 12 for generating runtime code 28 from inputted source code 16 and an interpreter 14 for executing the runtime code 28 in a runtime environment 34. Compiler 12 includes a programming specification 20 that many aspects operates in a similar manner to other known high level programming languages such as Ruby, Perl, etc. In addition to the traditional aspects, programming specification 20 includes bulk data constructs 22 that allows the programmer to define and operate on bulk data (e.g., arrays of data referred to herein as bulk data primitives "BDPs" 26) with a single bulk data operator 27. Thus, as described herein, entire arrays of "bulk data" may be operated on with a single statement, rather than using some type of looping construct such as a "for" statement. Thus for example, the programmer can include a single statement in the source code 16 to cause the square root of each entry in an array to be compute. Any number of BDPs 26 (i.e., BDP instances) may be defined and implemented within the platform 10.

When bulk data operations are encountered by the compiler 12, a set more efficient "low level" instructions 32 may be generated, e.g., in C, assembler, etc., to perform the operation at runtime with much less overhead. The remaining "non-bulk data" operations can processed by the compiler 12 using standard dynamic programming language techniques to generate high level instructions 30.

In addition, compiler 12 includes multithreading constructs 22 that allow the programmer to cause different processes to be executed by different threads at runtime. More importantly, multithreading constructs 24 may be implemented to allow different threads to implement bulk operations on "slices" of a shared memory space. Thus, for example, different sections (i.e., sub-arrays) of an N×M array of data may be operated on by different threads with bulk operators. The sharing of bulk data between different threads is implemented without data-level synchronization, thus giving the programmer the responsibility of ensuring the proper sequencing of operations amongst the different threads. Removing the built-in overhead of implementing data level synchronization by the compiler 12 greatly reduces the runtime overhead inherent in other dynamic programming platforms.

Once the runtime code 28 is generated, it can be loaded and executed within the runtime environment 34 via interpreter 14, stored in memory 36. Interpreter 14 is adapted to interact with CPU 38 to load and run different threads as dictated by runtime code 28. Interpreter 14 is also adapted to process both high level instructions 30 and low level instructions 32, and to allocate bulk data memory space 30, which includes bulk data that can be simultaneously processed by different threads on CPU 38. Resulting output 18, such as image processing, real time control, graphics rendering/rasterization, data modeling, etc., is generated via I/O 32. In some instances, output 18 may comprise a display device for displaying resulting visual data.

Bulk data primitives (BDPs) 26 comprise built-in object types within the dynamic language platform for implementing a BDP storage block of selected dimensions of a given built-in primitive element type. The list of possible built-in primitive element types may include: 8, 16, 32, and 64 bit integers, as well as 32 or 64 bit floating point values, 16 or 32 bit unicode characters, 32 and 64 bit complex number pairs, 9 or 16 element floating point matrices, etc. For each BDP data type, there are built-in handlers in the dynamic language runtime interpreter 14 that perform specified BDP operations, e.g., algebraic operations (e.g. addition, multiplication), comparison/logical operators (e.g. less than, equal to), and mathematical functions (e.g. sin( ), sqrt( )). The dynamic language specification 20 provides high-level idioms for well-defined algebraic element-wise c computations of BDPs, such as "a+b" and "sqrt(a)" while the language runtime offers specialized BDP handlers for each fundamental operator and built-in math function.

Figure 2:
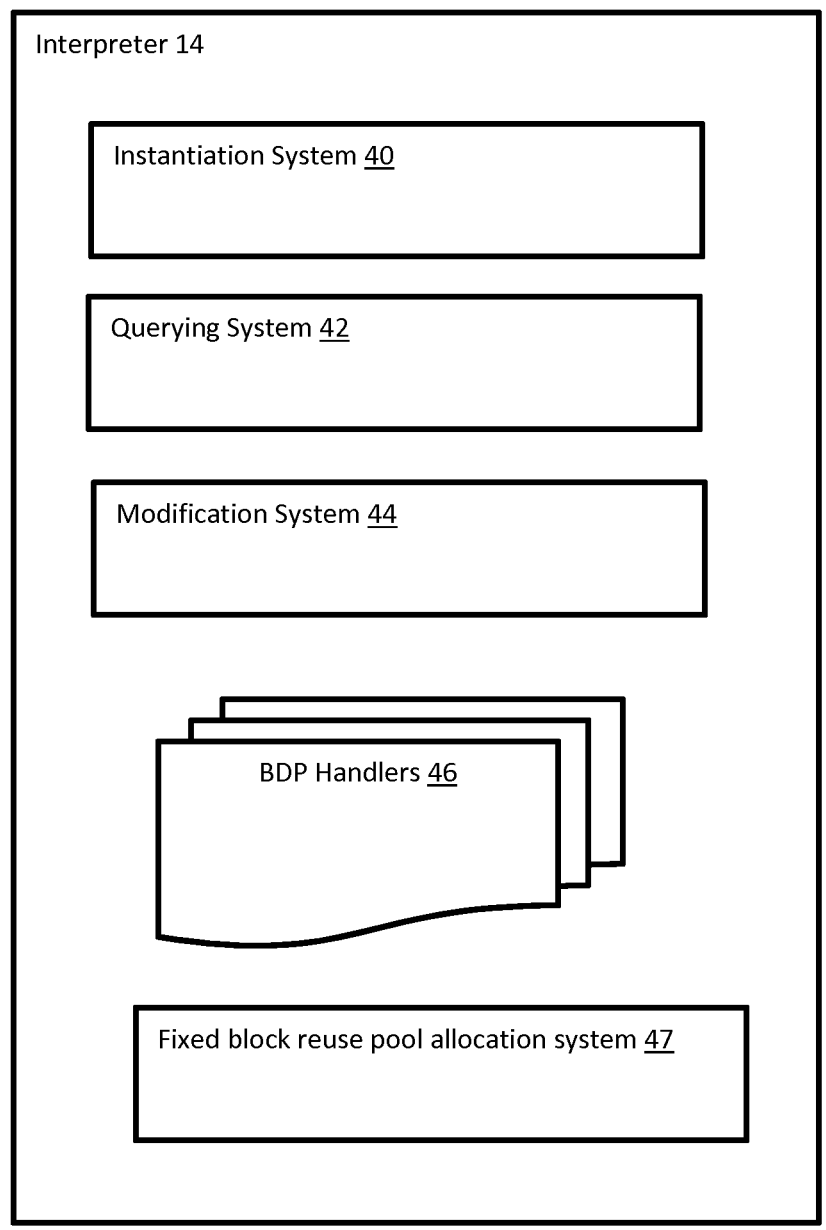
FIG. 2 shows and interpreter according to embodiments.

FIG. 2 depicts a further illustration of interpreter 14. Interpreter 14 generally includes: an instantiation system 40 for instantiating BDPs and their associated storage objects; a querying system 42 that provides access to data in each BDP instance, a modification system 44 that allows other processes to alter the dimensions of the BDP instance, and a set of BDP handlers that handle bulk data operations involving BDP instances.

When the interpreter 14 encounters a built-in operator or function with one or more BDP operands, it invokes execution of its specialized BDP handlers that loop and operate on the bulk data efficiently and without data-level synchronization. If the operands to a built-in function are not BDPs, then the interpreter 14 will instead invoke execution of other handlers that perform subsequent operand type introspection and invoke the correct handling of the operands based on their specific type. Hence, offering a built-in, synchronization-free, and transparently invoked bulk data computation mechanism sidesteps the inherent performance overhead otherwise paid by operating on data array elements individually. This design also supports "developer knows best" situations wherein developers specifically design data access patterns in ways such that no data-level synchronization is required.

With these systems, the dynamic language specification 20, compiler 12, and runtime interpreter 34 specifically offers support for: instantiating a BDP storage object of a given element type and set of dimensions; querying the dimensions of a BDP instance; altering the dimensions of a BDP instance; and instantiating a BDP that references a sub-range or "slice" of an existing BDP instance. Interpreter 14 also contains the accompanying necessary introspection logic that invokes the appropriate BDP-specific handler 46 for each built-in operator 27 the language supports. Further, since conventional primitive object types, such as a float32 and int32, can be conceptually represented as BDPs of size 1, conventional primitive object type instances can algebraically intermingle with BDPs 26 without any additional complexity.

The following outlines in further detail how the dynamic language specification 20 and its supporting interpreter 14 provides a built-in, bulk data computation subsystem designed to accommodate any bulk data computation design pattern that (a) incurs no more than the required overhead on a per data element basis, and (b) makes no assumptions or restrictions about how bulk data is accessed in a multi-threaded design pattern.

Each instance of a BDP consists of:
(1) A reference to an internal bulk data buffer object (i.e., BDP storage object);
(2) The logical dimensions of that BDP instance; and
(3) Offset and stride information that maps each logical element of that BDP instance to an element within the referenced BDP storage object. The storage object that a BDP internally references is heap-allocated and reference counted, allowing it to be inexpensively reclaimed when there are no longer any BDP instances referencing it. This also has the advantage of allowing the compiler 12 to create temporary and/or stack-based BDPs. Then it will be common and efficient for BDP storage objects to quickly be allocated, released, and reclaimed. The platform also permits different BDP instances to share the same underlying data, and to provide different views/slices into the data. For instance, a BDP storage object may include an entire set of graphics data for a display output. A first BDP instance may be implemented to process a first slice of the data (e.g., a left hand third of the graphics data) in a first thread, second BDP instance may be implemented to process a second slice of the data (e.g., a middle third of the graphics data) in a second thread and a third BDP instance may be implemented to process a third slice of the data in a third thread (e.g., a right hand third of the graphics data).

As described, BDP instances can be generated in response to processing unary or binary BDP operators (e.g., z=sqrt(x) or z=x+y). Depending on the situation, new BDP storage objects may need to be allocated on the fly during runtime. If such allocations were created and released using standard OS runtime constructs (e.g., malloc, free), a tremendous amount of wasted overhead would result since the allocation size is constant.

To address this, interpreter 14 may utilize a fixed-block reuse pool allocation system 47 (FIG. 2). In this approach, allocation blocks (which are of a fixed size) that are no longer referenced may be reused during runtime. If there are no unused blocks in the reuse pool when an allocation is required, a new pool of fresh blocks are allocated from the heap. The reference number associated with each BDP storage object makes this process easy to manage.

Instantiating a BDP with a given set of dimensions by instantiation system 40 includes:
(1) Allocating a new internal BDP storage object of appropriate byte size in the heap and initializing its reference count to 1;
(2) Storing a reference to that data object in the BDP instance (e.g., a memory address/pointer);
(3) Storing the requested logical dimensions in the BDP instance; and
(4) Storing the appropriate default stride and offset parameters for the referenced bulk data object.

Instantiating a BDP as a slice or reference of an existing/target BDP instance consists of:
(1) Dereferencing the existing BDP's storage object reference and automatically incrementing its reference count;
(2) Instantiating a new BDP with dimensions matching the explicitly or implicitly specified slice dimensions; and
(3) Propagating the existing BDP instance's internal element offset and stride parameters in chorus with the offset and stride parameters specified by the requested slice.

When a BDP instance is no longer referenced, its internal BDP storage object is dereferenced and its reference count is automatically decremented. Thus, if the updated reference count is 0, the BDP storage object can be deallocated/reclaimed.

Each runtime BDP handler 46 that performs a specified operator on one or more operand BDPs:
(1) De-references each operand's BDP storage object;
(2) If the operation is not an "in-place" style operator (e.g., +=), it instantiates a new BDP with dimensions derived from the operand's dimensions; and
(3) Iterates over each logical element of the BDP instance in an efficient/"tight" loop. For each logical element, it accesses its mapped data element in the dereferenced BDP storage object and performs the specified operator. If the operation is in-place, it stores the resulting data value back in the appropriate memory address it was accessed from. If the operation is not in-place (z=x+y), it stores the resulting data values in the newly created BDP instance/storage object.

This design also allows for additional BDP computation handlers to be added by developers to leverage platform computational hardware, such as modern GPU hardware. The dynamic language platform 10 can optionally include even higher performing platform-targeted BDP handlers that leverage platform hardware and could transparently replace the default CPU-based BDP handlers. In effect and by design, source code that invoked the use of BDPs at the language level would automatically leverage these specialized handlers without any source code changes whatsoever.

OpenCL, for example, is a generalized computing language specification that this BDP mechanism could invoke internally within the dynamic language runtime. For example, BDP objects above a certain size could be internally routed to BDP handlers 46 that wrap OpenCL computing objects.

Consider the computation work of calculating the length of a hypotenuse given a right triangle's two other sides. In Python, one could write a function that takes in the length of the two sides and returns the calculated hypotenuse:

```
def CalcHypot (a, b):
    c2=a*a+b*b
    return sqrt (c2)
```

In the event that the calculation must be run on N triangles, the traditional implementation would be something like:

```
for i in xrange(N):
    hypot[i]=CalcHypot(A[i], B[i])
```

In typical high performance computing scenarios (such as in scientific computing or finance), N could be a very large number, causing most of the CPU load to be runtime management of the repeated shuffling, passing, and cleanup of local variables and arguments for each iteration of the loop in comparison to the load associated with the numerical computation that it is intended to support.

Under the BDP concept, the code would instead appear as a single invocation of CalcHypot( ):

```
# Declare a BDP of size N×1 of type float:
A=N*float
B=N*float
hypot=CalcHypot(A, B)
```

In this form, when the runtime jumps to CalcHypot( ) and invokes its first operator, the multiply operator to calculate "a*a", the runtime would observe that both operands are a BDP instance and dispatch handing to the BDP-specific handler. That handler internally calculates the product of "a*a" and returns a new BDP instance with dimensions consistent with the operands. This pattern continues with "b*b" and "sqrt(c2)", each returning a BDP instance with dimensions derived from the operand's dimensions. In this example, the dimensions of each implicit intermediate BDP calculated in CalcHypot( ) would be of size N. Compared to conventional approach above, the total running time would be close to ideal in comparison. In the conventional code above, there would be roughly the overhead of running every operation N times, including the overhead associated with passing parameters, jumping to a function, and cleanup associated with returning from that function—paid for each of the N problem instances. In the BPD approach, there's only the single invocation and return of CalcHypot( ) in addition to the algebraic load of what the code sets out to compute. In other words, the conventional idiom tends to have a very high total-to-payload instruction ratio while the BDP total-to-payload ratio approaches 1:1 as the data set size increases since the overhead remains fixed when BDPs are used.

Figure 3:
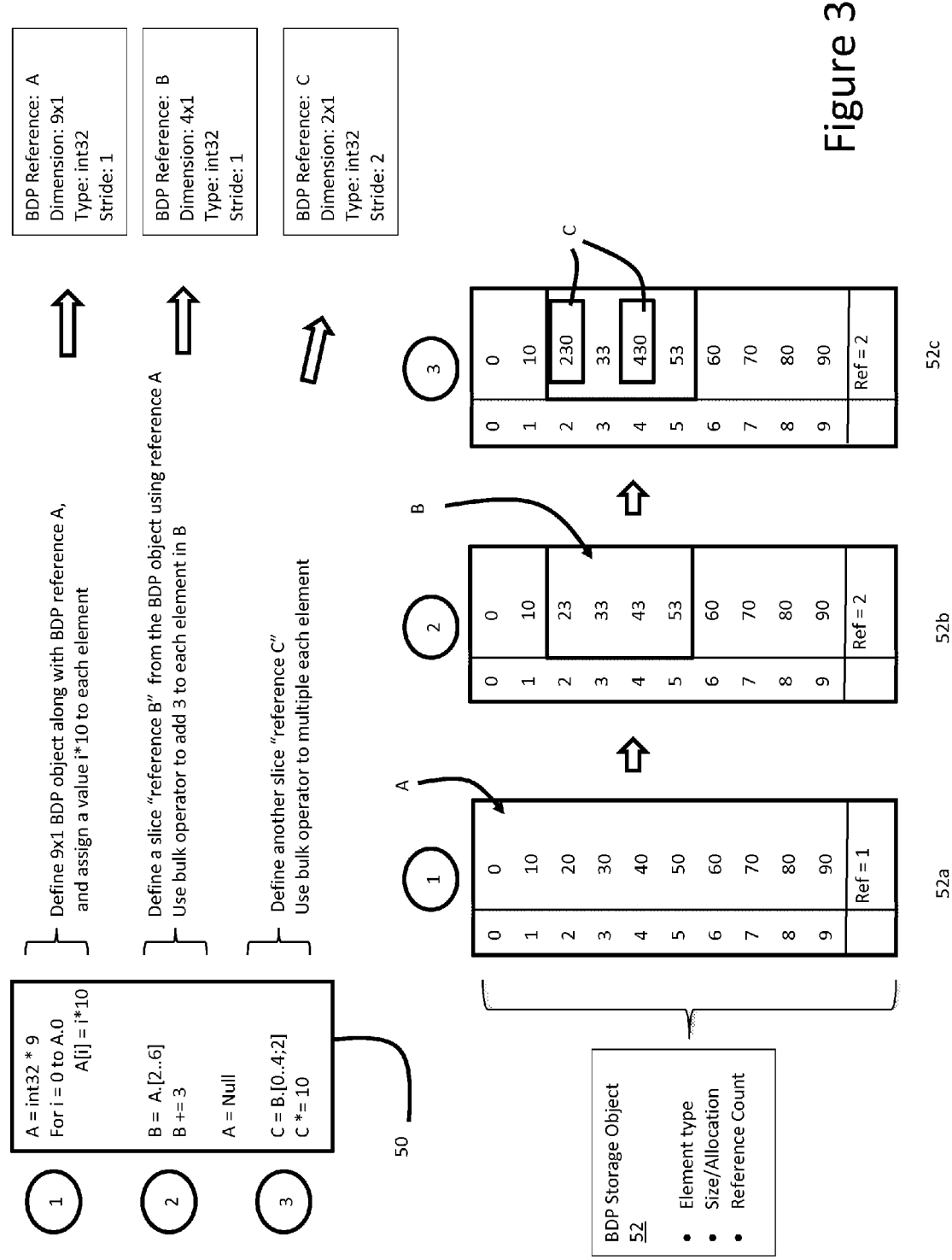
FIG. 3 shows an example of a BDP operation according to embodiments.

FIG. 3 depicts an example of how a source code segment 50 that utilizes BDP operations on a shared storage object 52 is processed during runtime. For reference purposes, code segment 50 is broken into three phases 1, 2, and 3. In phase 1, the first line of code "A=int32*9" causes a BDP storage object 52 to be created, in this case a 9×1 array of type 32 bit integers. In addition, a BDP reference "A" is created that references the entire storage object 52. The next two lines of code assign values i*10 to each element in the storage object 52. The resulting storage object 52 after phase 1 is shown at 52a. As can be seen, a reference value is set to "1" indicating that the storage object 52 is currently referenced by a single BDP reference, A.

The first line of code in phase 2 provides the statement B=A.[2 . . . 6], which creates a new BDP instance "reference B" based on BDP reference A. In this case, reference B defines a slice of the storage element 52, comprising elements 2, 3, 4 and 5. Next, a BDP operator B=+3 is used to cause the same operation to be performed on each of the elements defined by the B reference. In this case, each element is incremented by 3. The resulting update to storage object 52 is shown in 52b. As also shown, the reference value is set to "2" indicating that two BDP references (A and B) have access to slices of the storage object 52.

The next line of code, between phase 1 and phase 2, comprises the statement A=Null. This results in the BDP reference A being removed. However, the data in storage object 52 does not change.

In phase 3, the line of code C=B.[0 . . . 4;2] creates a new BDP reference C that provides a further slice of the storage object 52. In this case, C references four elements of B, however with a stride of 2 (i.e., every other element). Next, the code line C*=10 implements another BDP operator that causes each element of C to be multiplied by 10. The resulting storage object 52 is shown in 52c. As shown the reference value is set to 2, indicating that the storage object is accessible by two BDP references B and C (A was removed previously).

A completely new BDP storage object could be instantiated by a statement that does not involve an "in-place" operator such as D=A+B. Since D is the output of the operator, a new BDP instance/storage object is created.

Using these processes, different threads can be instructed to operate on different slices of a single storage object 52 and the slices can be processed with different BDP operators. This thus provides for a very robust platform to implement code to efficiently process large amounts of data in a multithreading runtime environment.

The present invention may be implemented as a system, a method, and/or a computer program product. The computer program product may include a computer readable storage medium (or media) having computer readable program instructions thereon for causing a processor to carry out aspects of the present invention. In some instances, the invention may be embodied as a compiler and interpreter, just a compiler, or just an interpreter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative runtime environment 34 that may be implemented on any type of computing device. Such a computing device may for example include at least one processor (CPU) 38, memory 36, an input/output (I/O) 32 (e.g., one or more I/O interfaces and/or devices), and a communications pathway. In general, CPU executes program code, such as interpreter 14, which is at least partially fixed in memory 36. While executing program code, CPU 38 can process data, which can result in reading and/or writing transformed data from/to memory 36 and/or I/O 32 for further processing. Pathway provides a communications link between each of the components. I/O 32 can comprise one or more human I/O devices, which enable a user to interact with runtime environment 34. To this extent, interpreter 14 can manage a set of interfaces (e.g., graphical user interfaces, application program interfaces, etc.) that enable humans and/or other systems to interact therewith. Further, interpreter 14 can manage (e.g., store, retrieve, create, manipulate, organize, present, etc.) data using any solution.

As shown, interpreter 14 processes runtime code 28, which includes one more BDP based actions, and can for example be run on a CPU 38 having multithreading capabilities for processing bulk data (e.g., a general processing unit or GPU).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer program product stored on a non-transitory computer readable storage medium, which when executed by a computing system implements a dynamic programming platform, the computer program product comprising program instructions that:

generates code for a multithreaded runtime environment from inputted program instructions, and that provides an infrastructure for sharing bulk data between different threads without data-level synchronization;

recognize and process a predefined set of bulk data operators included in the inputted program instructions, wherein each bulk data operator allows a set of data items forming the bulk data to be operated on with a single operator; and provide handlers for processing the predefined set of bulk data operators, wherein the handlers operate on slices of the bulk data during runtime while other threads of the multithreaded runtime environment simultaneously process the bulk data.

2. The computer program product of claim 1, wherein the infrastructure includes a compiler for generating runtime code having a programming specification for creating bulk data primitive (BDP) instances and implementing BDP operators to bulk operate on data stored in created BDP instances.

3. The computer program product of claim 2, wherein the program instructions comprise an interpreter that processes runtime code and includes: a process for instantiating a BDP instance of a given element type and a set of dimensions; a process for querying the dimensions of a BDP instance, a process for altering the dimensions of a BDP instance; and a process for instantiating a BDP instance that references a slice of an existing BDP instance.

4. The computer program product of claim 3, wherein the process for instantiating a BDP includes:
allocating a new BDP data storage object of appropriate byte size in a heap and initializing a reference count to 1;
storing a reference to that data object in the BDP instance;
storing requested logical dimensions in the BDP instance; and
storing default stride and offset parameters for the new BDP data storage object.

5. The computer program product of claim 4, wherein the process for instantiating the BDP instance that references the slice of the existing BDP instance includes:
dereferencing a BDP storage object reference of the existing BDP instance and incrementing the reference count;
instantiating a new BDP instance with dimensions matching specified slice dimensions; and
propagating an internal element offset and stride parameters of the existing BDP instance in chorus with offset and stride parameters specified by a requested slice.

6. The computer program product of claim 2, further comprising a set of BDP handlers for processing BDP operations at runtime.

7. The computer program product of claim 6, wherein implementing a BDP handler for processing a BDP instance having a set of operands includes:
dereferencing a BPD storage object for each operand;
if a BDP operation is not an in-place style operator, instantiating a new BDP instance with dimensions derived from dimensions of the operand and iterating over each logical element of the BDP instance using a loop with a specified operator;
if the operation is an in-place style operator, storing each resulting data value back in an appropriate memory address of the BDP storage object.

8. A dynamic programming platform, comprising:
at least one computing system having a processor and a memory;
a compiler for generating runtime code and having a programming specification for creating bulk data primitive (BDP) instances and implementing BDP operators to bulk operate on data stored by BDP instances, and for supporting multithreaded operations without data-level synchronization; and an interpreter for processing the runtime code on the at least one computing system and having a set of BDP handlers for processing BDP operators at runtime, the interpreter including a system for instantiating a BDP instance of a given element type and a set of dimensions; a system for querying the dimensions of a BDP instance; a system for altering the dimensions of a BDP instance; and a system for instantiating a new BDP instance that references a slice of an existing BDP instance.

9. The dynamic programming platform of claim 8, wherein the each BDP instance includes an array of data and each BDP operator can be implemented with a single statement.

10. The dynamic programming platform of claim 8, wherein instantiating the BDP instance includes allocating memory space in the memory using a heap.

11. The dynamic programming platform of claim 10, wherein the instantiating further includes:
allocating a new BDP storage object of appropriate byte size in the heap and initializing a reference count to 1;
storing a reference to the new BDP storage object in the BDP instance;
storing requested logical dimensions in the BDP instance; and
storing default stride and offset parameters for the new BDP storage object.

12. The dynamic programming platform of claim 8, wherein the system for instantiating the BDP instance that references a slice of an existing BDP instance includes:
a process for dereferencing a BDP storage object reference of an existing BDP instance and incrementing a reference count;
a process for instantiating a new BDP instance with dimensions matching specified slice dimensions; and
a process for propagating an internal element offset and stride parameters of the existing BDP instance in chorus with offset and stride parameters specified by a requested slice.

13. The dynamic programming platform of claim 8, wherein implementing a BDP handler for processing a BDP operator with respect to a BDP instance includes:
dereferencing a BDP storage object for each operand of the BDP instance;
if a BDP operation is not an in-place style operator, instantiating a new BDP instance with dimensions derived from dimensions of the operand and iterating over each logical element of the BDP instance using a loop with a specified BDP operator;
if the operation is an in-place style operator, storing resulting data values back in an appropriate memory address.

14. The dynamic programming platform of claim 8, wherein the processor includes a multithreading infrastructure, and wherein the interpreter causes different slices of a BDP storage object to be processed in different threads of the processor.

15. A computing system having interpreter for processing runtime code, the interpreter comprising:
a set of bulk data primitive (BDP) handlers for processing BDP operators;
a system for instantiating a BDP instance of a given element type and set of dimensions, wherein the BPD instance includes an associated BDP storage object allocated in a memory heap of the computing system;
a system for instantiating further BDP instances that reference a slice of an existing BDP instance; and a system for processing different BDP instances on different threads of a multithreading infrastructure.

16. The computing system of claim 15, wherein the each BDP instance includes an array of data and each BDP operator operates on an entire array of data.

17. The computing system of claim 15, wherein instantiating a BDP instance includes:
   allocating a new BDP storage object of appropriate byte size in the heap and initializing a reference count to 1;
   storing a reference to the new BDP storage object in the BDP instance;
   storing requested logical dimensions in the BDP instance; and
   storing default stride and offset parameters for the new BDP storage object.

18. The computing system of claim 15, wherein the system for instantiating further BDP instances that reference a slice of an existing BDP instance includes:
   a process for dereferencing a BDP storage object reference of an existing BDP instance and incrementing a reference count;
   a process for instantiating a new BDP instance with dimensions matching specified slice dimensions; and
   a process for propagating an internal element offset and stride parameters of the existing BDP instance in chorus with offset and stride parameters specified by a requested slice.

19. The computing system of claim 15, wherein implementing a BDP handler for processing a BDP operator with respect to a BDP instance includes:
   dereferencing a BDP storage object for each operand of the BDP instance;
   if a BDP operation is not an in-place style operator, instantiating a new BDP instance with dimensions derived from dimensions of the operand and iterating over each logical element of the BDP instance using a loop with a specified BDP operator;
   if the operation is an in-place style operator, storing resulting data values back in an appropriate memory address.

20. The computing system of claim 15, further comprising an output connectable to a device for displaying visual data, wherein the visual data is stored in a common data storage object and processed on multiple threads by different BDP instances.

* * * * *